United States Patent [19]

Kim

[11] Patent Number: 5,749,050

[45] Date of Patent: May 5, 1998

[54] AUTOMATIC EMERGENCY ALARM RECEPTION APPARATUS USING SPECIFIC FREQUENCY

[76] Inventor: Jae Sung Kim, Rm. 505, Chugong Apt. No. 405, Chungkae 4-dong, Nowon-Ku, Seoul, Rep. of Korea

[21] Appl. No.: 726,899

[22] Filed: Oct. 7, 1996

[51] Int. Cl.$^6$ .................................................. H04B 1/16
[52] U.S. Cl. .................................. 455/228; 455/142
[58] Field of Search .............................. 455/227, 228, 455/229, 133, 140, 142, 303, 306, 338, 339; 340/825.44, 825.45, 825.47, 825.74, 539; H04B 1/16

[56] References Cited

U.S. PATENT DOCUMENTS

| | | | |
|---|---|---|---|
| 3,657,655 | 4/1972 | Fukqata | 455/228 |
| 3,921,074 | 11/1975 | Baird | 455/227 |
| 4,020,421 | 4/1977 | Elder et al. | 455/229 |
| 4,079,317 | 3/1978 | Baird | 455/227 |
| 4,334,319 | 6/1982 | Gurry | 455/227 |
| 4,479,252 | 10/1984 | Souchay et al. | 455/229 |

FOREIGN PATENT DOCUMENTS

| | | | |
|---|---|---|---|
| 57-18137 | 1/1982 | Japan | H04B 1/16 |
| 55-185789 | 7/1982 | Japan | H04L 27/14 |
| 58-129836 | 8/1983 | Japan | H04B 1/16 |
| 61-30128 | 2/1986 | Japan | H04B 1/16 |
| 61-28226 | 7/1986 | Japan | H04B 1/06 |
| 62-132440 | 6/1987 | Japan | H04B 1/16 |
| 1-77227 | 3/1989 | Japan | H04B 1/16 |
| 64-53635 | 3/1989 | Japan | H04B 1/16 |
| 3-110926 | 5/1991 | Japan | H04B 1/16 |
| 3-150930 | 6/1991 | Japan | H04B 1/16 |

Primary Examiner—Nguyen Vo
Assistant Examiner—Makoto Aoki
Attorney, Agent, or Firm—Phillips, Moore, Lempio & Finley

[57] ABSTRACT

An automatic emergency alarm reception apparatus for a broadcasting receiver which has a radio frequency part and a low frequency part, comprising an ON/OFF switch connected between the radio frequency part and the low frequency part, for turning on the broadcasting receiver when a specific frequency signal indicative of a state of emergency is received at an antenna of the broadcasting receiver, and an emergency alarm signal detection circuit for detecting the specific frequency signal from the radio frequency part to control the ON/OFF switch. The emergency alarm signal detection circuit includes an air defense alarm signal detection part and an air-raid alarm signal detection part. The air defense alarm signal detection part is provided with a band pass filter, a level comparator, an inverter, a pulse generator and a counter. The air-raid alarm signal detection part is provided with first to third band pass filters, first to third level comparators and a sequential detector. The emergency alarm signal detection circuit further includes an OR gate for performing an OR operation with respect to an output signal from the counter and an output signal from the sequential detector, and an R-S flip-flop for controlling the ON/OFF switch in response to an output signal from the OR gate.

2 Claims, 2 Drawing Sheets

AUTOMATIC EMERGENCY ALARM RECEPTION APPARATUS USING SPECIFIC FREQUENCY

BACKGROUND OF THE INVENTION

1. Field of the Invention

The present invention relates to an automatic emergency alarm reception apparatus using a specific frequency, which is capable of, when an emergency alarm situation is broadcast due to the occurrence of a state of emergency or a natural disaster, automatically operating broadcasting receivers to allow people to watch or listen to an emergency alarm broadcast through operated broadcasting receivers.

2. Description of the Prior Art

Generally, when a state of emergency or a natural disaster occurs, a siren alarm is sounded and television or radio broadcasting stations urgently inform the people of such a situation.

However, the siren alarm is limited in audible range and the status of the emergency cannot be transferred in detail to the people. Further, although the people possess televisions or radio receivers, they may not recognize the contents and degree of the emergency because they may neither be watching the television receivers nor listening to the radio receivers. As a result, the people cannot rapidly cope with the emergency state.

The delay of emergency notification increases the damage in regions in which the danger of a war or a natural disaster is potentially present. As a result, there is required means for rapidly and individually notifying a state of emergency over the entire area or the whole country.

SUMMARY OF THE INVENTION

Therefore, the present invention has been made in view of the above problem, and it is an object of the present invention to provide an automatic emergency alarm reception apparatus using a specific frequency, which is capable of, when an emergency alarm situation is broadcast due to the occurrence of a state of emergency or a natural disaster, automatically turning on television receivers or radio receivers to allow people to watch or listen to the emergency alarm broadcast through the turned-on television receivers or radio receivers.

In accordance with an embodiment of the present invention, an automatic emergency alarm reception apparatus is applied to a radio receiver which has a radio frequency part and a low frequency part. In this embodiment, the automatic emergency alarm reception apparatus comprises an ON/OFF switch connected between the radio frequency part and the low frequency part, for turning on a radio receiver when a specific frequency signal indicative of a state of emergency is received at an antenna of the radio receiver; and emergency alarm signal detection means for detecting the specific frequency signal from the radio frequency part to control the ON/OFF switch, the emergency alarm signal detection means including an amplifier for amplifying the specific frequency signal from the radio frequency part, first to third band pass filters for band pass filtering an output signal from the amplifier at first to third bands, respectively, first to third level comparators for wave-shaping output signals from the first to third band pass filters, respectively, an inverter for inverting an output signal from the second level comparator, a counter for counting an output signal from the inverter to detect an air defense alarm signal therefrom, a pulse generator for generating a pulse in the unit of second and outputting the generated pulse to the counter, a sequential detector for detecting an air-raid alarm signal from output signals from the first and third level comparators and the output signal from the second level comparator, an OR gate for performing an OR operation with respect to an output signal from the counter and an output signal from the sequential detector, and an R-S flip-flop for generating a control signal in response to an output signal from the OR gate and outputting the generated control signal to the ON/OFF switch.

In accordance with another embodiment of the present invention, the automatic emergency alarm reception apparatus is applied to a television receiver. In this embodiment, the ON/OFF switch is connected between a tuner/intermediate frequency process block and an audio/video process block, for turning on the television receiver when the specific frequency signal indicative of the emergency state is received at an antenna of the television receiver, and the emergency alarm signal detection means is connected to the ON/OFF switch to control it.

The specific frequency signal is transmitted when a natural disaster or a state of emergency having a great effect on the on the national well-being occurs. At this time, the transmission of the specific frequency signal is not limited to a specific broadcasting station but performed by all government-run and private broadcasting stations.

Alternatively, an electronic tuning control circuit may be contained in the broadcasting receivers, such as the radio and television receivers, to designate the specific broadcasting station. The electronic tuning control circuit automatically selects the specific broadcasting station when the broadcasting receiver receives the specific frequency signal from the specific broadcasting station. However, this case is difficult to adopt because the existing broadcasting receivers must be replaced with new ones with the electronic tuning control circuit. In order to solve such a problem, broadcasting receiver manufacturers have to enter into an agreement with the specific broadcasting stations to produce broadcasting receivers with the electronic tuning control circuit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

It should be noted herein that an automatic emergency alarm reception apparatus of the present invention can be applied to both a radio receiver and a television receiver as seen from FIGS. 1 to 4. However, because the radio receiver and the television receiver are substantially the same in technical construction, the automatic emergency alarm reception apparatus of the present invention will hereinafter be described in detail in conjunction with the radio receiver.

Figure 1:
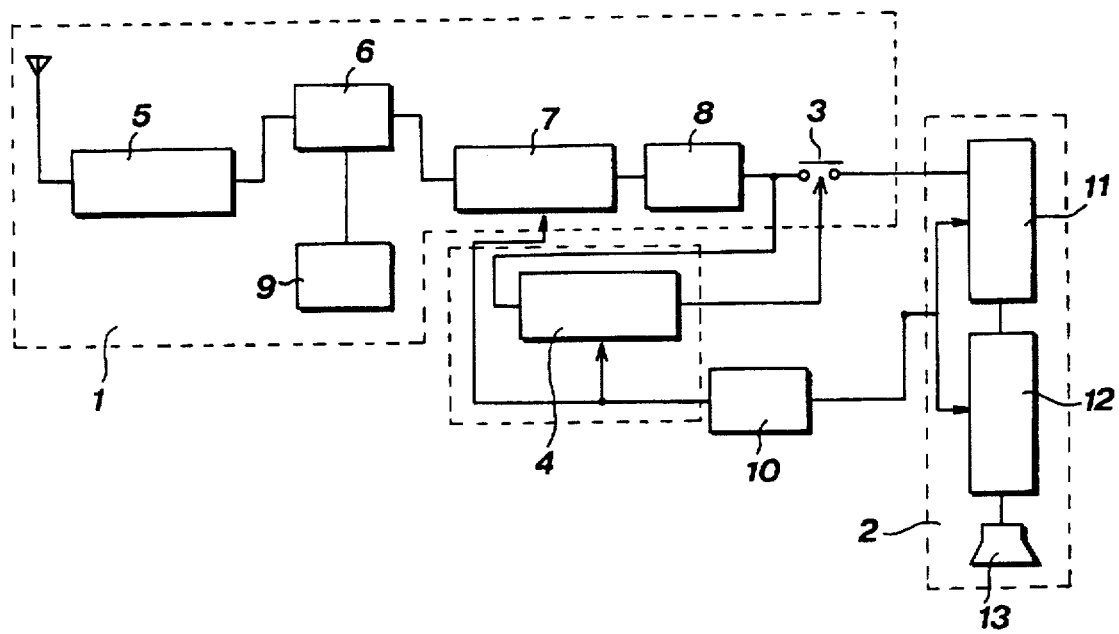
FIG. 1 is a schematic block diagram illustrating the construction of a radio receiver to which an automatic emergency alarm reception apparatus is applied in accordance with an embodiment of the present invention.

Referring to FIG. 1, there is schematically shown in block form the construction of a radio receiver to which an automatic emergency alarm reception apparatus is applied in accordance with an embodiment of the present invention. As shown in this drawing, the automatic emergency alarm reception apparatus comprises an ON/OFF switch 3 connected between a radio frequency part 1 and a low frequency part 2, for turning on the radio receiver when a specific frequency signal indicative of a state of emergency is received at an antenna of the radio receiver, and an emergency alarm signal detection circuit 4 for detecting the specific frequency signal from the radio frequency part 1 to control the ON/OFF switch 3. The radio frequency part 1 is adapted to receive a broadcasting signal and the low frequency part 2 is adapted to amplify an audio signal and output the amplified audio signal externally.

In FIG. 1, the reference numeral 5 designates a radio frequency amplifier, the reference numeral 6 designates a mixer, the reference numeral 7 designates an intermediate frequency amplifier, the reference numeral 8 designates a detector, the reference numeral 9 designates an oscillator, the reference numeral 10 designates a power supply circuit, the reference numeral 11 designates an audio amplifier, the reference numeral 12 designates an audio output unit and the reference numeral 13 designates a speaker.

Figure 2:
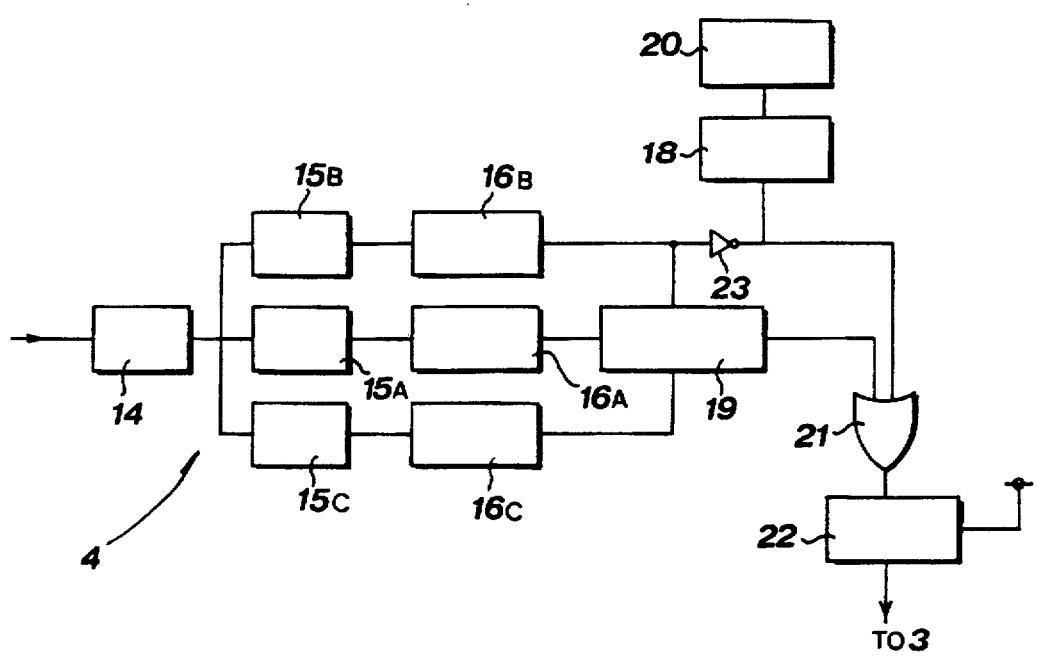
FIG. 2 is a detailed block diagram of an emergency alarm signal detection circuit in FIG. 1.

FIG. 2 is a detailed block diagram of the emergency alarm signal detection circuit 4 in FIG. 1. As shown in this drawing, the emergency alarm signal detection circuit 4 includes an amplifier 14 for amplifying the specific frequency signal from the radio frequency part 1, band pass filters 15A–15C for band pass filtering an output signal from the amplifier 14 at first to third bands, respectively, level comparators 16A–16C for wave-shaping output signals from the band pass filters 15A–15C, respectively, a counter 18 for counting an output signal from the level comparator 16B, a sequential detector 19 for detecting an emergency alarm signal from the output signals from the level comparators 16A–16C, a pulse generator 20 for generating a pulse in the unit of seconds and outputting the generated pulse to the counter 18, an OR gate 21 for performing an OR operation with respect to an output signal from the counter 18 and an output signal from the sequential detector 19, an R-S flip-flop 22 for generating a control signal in response to an output signal from the OR gate 21 and outputting the generated control signal to the ON/OFF switch 3, and an inverter 23 connected between the level comparator 16B and the counter 18.

In the emergency alarm signal detection circuit 4, the band pass filter 15B, level comparator 16B, inverter 23, pulse generator 20 and counter 18 constitute means for detecting an air defense alarm signal, and the band pass filters 15A–15C, level comparators 16A–16C and sequential detector 19 constitute means for detecting an air-raid alarm signal.

Figure 3:
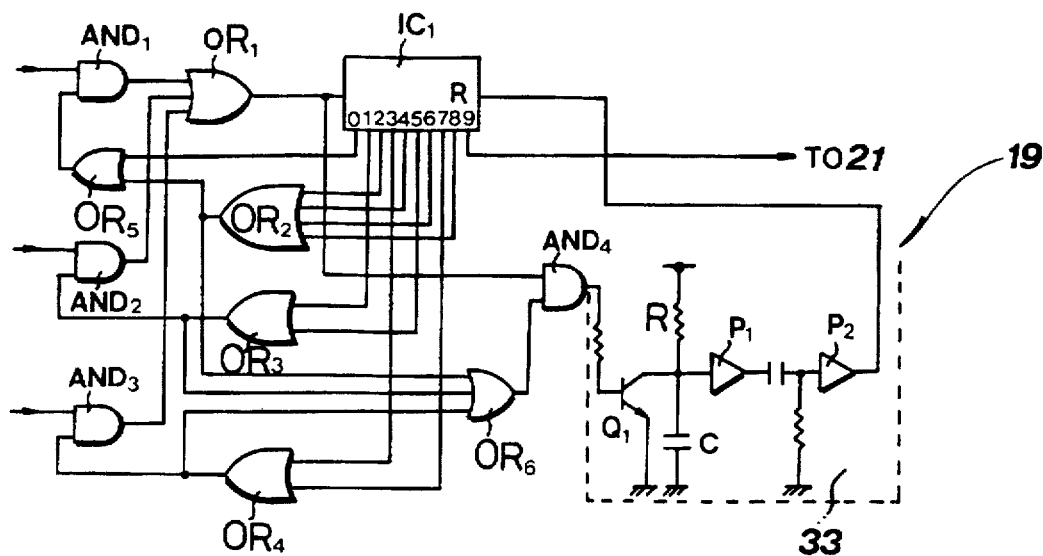
FIG. 3 is a detailed circuit diagram of a sequential detector in FIG. 2.

FIG. 3 is a detailed circuit diagram of the sequential detector 19 in FIG. 2. As shown in this drawing, the sequential detector 19 includes AND gates AND1–AND3 for inputting the output signals from the level comparators 16A–16C, respectively, an OR gate OR1 for performing an OR operation with respect to output signals from the AND gates AND1–AND3 and outputting the ORed result to a set terminal of a detection counter IC1, an OR gate OR2 for performing an OR operation with respect to third, fifth, seventh and ninth output signals 2, 4, 6 and 8 from the detection counter IC1, an OR gate OR3 for performing an OR operation with respect to second and sixth output signals 1 and 5 from the detection counter IC1 and outputting the ORed result to the AND gate AND2, and an OR gate OR4 for performing an OR operation with respect to fourth and eighth output signals 3 and 7 from the detection counter IC1 and outputting the ORed result to the AND gate AND3.

The sequential detector 19 further includes an OR gate OR5 for performing an OR operation with respect to a first output signal 0 from the detection counter ICI and an output signal from the OR gate OR2 and outputting the ORed result to the AND gate AND1, an OR gate OR6 for performing an OR operation with respect to output signals from the OR gates OR2–OR4, an AND gate AND4 for performing an AND operation with respect to output signals from the OR gates OR1 and OR6, and a reset circuit 33 for resetting the detection counter IC1 in response to an output signal from the AND gate AND4.

The reset circuit 33 is provided with a transistor Q1, wave-shaping circuits P1 and P2, a resistor R and a capacitor C. The resistor R and capacitor C cooperate to determine a time constant.

The detection counter IC1 is adapted to perform a counting operation in the unit of seconds to provide its tenth output signal 9 to the OR gate 21 in FIG. 2.

Figure 4:
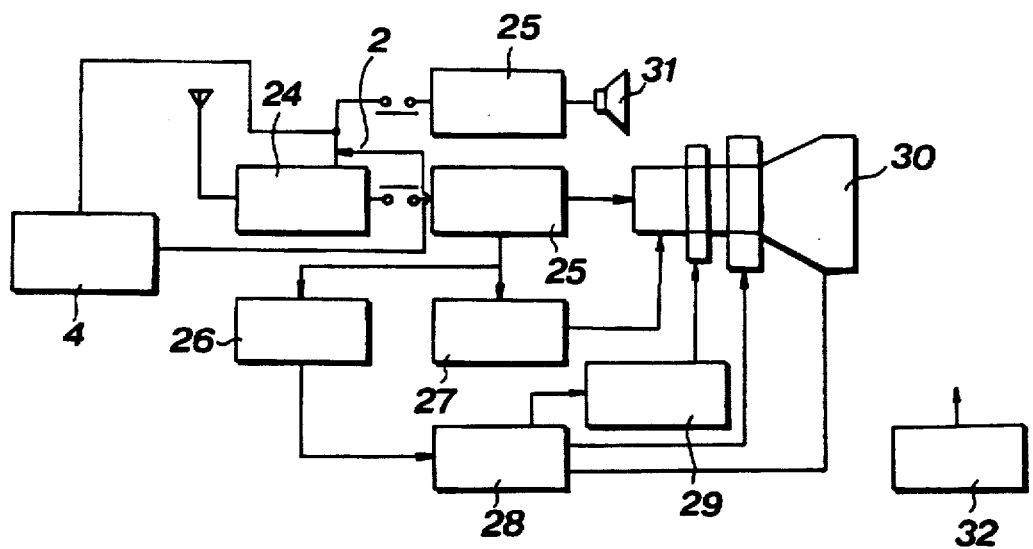
FIG. 4 is a schematic block diagram illustrating the construction of a television receiver to which the automatic emergency alarm reception apparatus is applied in accordance with an alternative embodiment of the present invention.

FIG. 4 is a schematic block diagram illustrating the construction of a television receiver to which the automatic emergency alarm reception apparatus is applied in accordance with an alternative embodiment of the present invention. As shown in this drawing, the ON/OFF switch 3 is connected between a tuner/intermediate frequency process block 24 and an audio/video process block 25, for turning on the television receiver when the specific frequency signal indicative of the emergency state is received at an antenna of the television receiver, and the emergency alarm signal detection circuit 4 is connected to the ON/OFF switch 3 to control it.

In FIG. 4, the reference numeral 26 designates a synchronization process block, the reference numeral 27 designates a chrominance process block, the reference numeral 28 designates a deflection high voltage process block, the reference numeral 29 designates a convergence process block, the reference numeral 30 designates a cathode ray tube, the reference numeral 31 designates a speaker and the reference numeral 32 designates a power supply block.

The second embodiment in FIG. 4 is substantially the same in operation as the first embodiment in FIG. 1 and a detailed description thereof will thus be omitted.

Now, the operation of the automatic emergency alarm reception apparatus with the above-mentioned construction in accordance with the first embodiment of the present invention will hereinafter be described in detail.

When the radio and television receivers receive the emergency alarm signal at their antennas under the condition that they are at their ON states, they give an alarm.

On the other hand, in the case where an air-raid alarm signal of a specific frequency (sinusoidal wave) is received at the antenna of the radio receiver and applied to the emergency alarm signal detection circuit 4, it is amplified by the amplifier 14 and band pass filtered by the band pass filters 15A–15C. The level comparators 16A–16C wave-shape the output signals from the band pass filters 15A–15C to generate square wave pulse signals, respectively.

In the sequential detector 19, the AND gates AND1–AND3 input the square wave pulse signals from the level comparators 16A–16C, respectively. Namely, the AND gate AND1 inputs the square wave pulse signal from the level comparator 16A at its one input terminal and the first output signal 0 from the detection counter IC1 at its other input terminal, previously transferred through the OR gate OR5. As a result, the OR gate OR1 sets the detection counter IC1, thereby causing the detection counter IC1 to count "1". Then, the detection counter IC1 sequentially counts "2" and "3" in response to the square wave pulse signals from the level comparators 16A and 16B in a similar manner to the square wave pulse signal from the level comparator 16A.

At that time the count of the detection counter IC1 reaches a predetermined threshold value during the counting operation, the detection counter IC1 applies its tenth output signal 9 to the OR gate 21 in the emergency alarm signal detection circuit 4. At this time, in the emergency alarm signal detection circuit 4, the R-S flip-flop 22 is set in response to the output signal from the OR gate 21 to turn on the ON/OFF switch 3. As the ON/OFF switch 3 is turned on, an air-raid alarm sound is outputted through the speaker 13.

However, in the case where the count of the detection counter IC1 does not reach the predetermined threshold value during the counting operation, the output signal of the AND gate AND4 goes low in level, thereby causing the transistor Q1 in the reset circuit 33 to be turned off. As a result, in the reset circuit 33, the wave-shaping circuits P1 and P2 are operated after the delay of the time constant determined by the resistor R and capacitor C, to reset the detection counter IC1. As the detection counter IC1 is reset, the ON/OFF switch 3 remains at its OFF state.

On the other hand, in the case where an air defense alarm signal (substantially, continuously oscillating sound) is received at the antenna of the radio receiver and applied to the emergency alarm signal detection circuit 4, it is amplified by the amplifier 14 and band pass filtered by the band pass filter 15B. The level comparator 16B wave-shapes the output signal from the band pass filter 15B to generate a square wave pulse signal. The square wave pulse signal from the level comparator 16B is inverted by the inverter 23, thereby causing a reset terminal of the counter 18 to go low in level. As a result, the counter 18 performs its counting operation continuously.

If the level comparator 16B continuously outputs the square wave pulse signal due to the continuous pulse input although the count of the counter 18 reaches a predetermined threshold value, the counter 18 provides its output signal to the OR gate 21 to set the R-S flip-flop 22. As the R-S flip-flop 22 is set, it turns on the ON/OFF switch 3, thereby allowing an air defense alarm sound to be outputted through the speaker 13.

As apparent from the above description, according to the present invention, when the broadcasting receiver receives the air defense alarm signal or air-raid alarm signal of the specific frequency at its antenna under the condition that it is at its OFF state, it automatically gives the air defense alarm or air-raid alarm. Therefore, a state of emergency, such as a disaster in a specific region, and special news about a national crisis can rapidly be transferred to the people for the protection of lives and property.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a broadcasting receiver which has a radio frequency par; and a low frequency part, an automatic emergency alarm reception apparatus comprising:

an ON/OFF switch connected between said radio frequency part and said low frequency part, for turning on said broadcasting receiver when a specific frequency signal indicative of a state of emergency is received at an antenna of said broadcasting receiver; and emergency alarm signal detection means for detecting the specific frequency signal from said radio frequency part to control said ON/OFF switch, said emergency alarm signal detection means including an amplifier for amplifying the specific frequency signal from said radio frequency part, first to third band pass filters for band pass filtering an output signal from said amplifier at first to third bands, respectively, first to third level comparators for wave-shaping output signals from said first to third band pass filters, respectively, an inverter for inverting an output signal from said second level comparator, a counter for counting an output signal from said inverter to detect an air defense alarm signal therefrom, a pulse generator for generating a pulse in the unit of seconds and outputting the generated pulse to said counter, a sequential detector for detecting an air-raid alarm signal from output signals from said first and third level comparators and the output signal from said second level comparator, an OR gate for performing an OR operation with respect to an output signal from said counter and an output signal from said sequential detector, and an R-S flip-flop for generating a control signal in response to an output signal from said OR gate and outputting the generated control signal to said ON/OFF switch.

2. An automatic emergency alarm reception apparatus as set forth in claim 1, wherein said broadcasting receiver includes a television receiver.

* * * * *